(12) United States Patent
Pelt et al.

(10) Patent No.: US 10,747,928 B2
(45) Date of Patent: Aug. 18, 2020

(54) DIAGNOSTIC TESTING OF FPGAS FOR SAFETY CRITICAL SYSTEMS

(71) Applicant: Intel IP Corporation, Santa Clara, CA (US)

(72) Inventors: Robert Pelt, Austin, TX (US); Balatripura Chavali, Sugar Land, TX (US)

(73) Assignee: Intel IP Corporation, Santa Clara, CA (US)

( * ) Notice: Subject to any disclaimer, the term of this patent is extended or adjusted under 35 U.S.C. 154(b) by 2 days.

(21) Appl. No.: 16/236,440

(22) Filed: Dec. 29, 2018

(65) Prior Publication Data

US 2019/0384883 A1    Dec. 19, 2019

(51) Int. Cl.
| | |
|---|---|
| G06F 30/30 | (2020.01) |
| G06F 11/263 | (2006.01) |
| G06F 30/34 | (2020.01) |
| G06F 30/33 | (2020.01) |
| G06F 30/327 | (2020.01) |
| G06F 30/3323 | (2020.01) |

(52) U.S. Cl.
CPC ............ *G06F 30/34* (2020.01); *G06F 11/263* (2013.01); *G06F 30/327* (2020.01); *G06F 30/33* (2020.01); *G06F 30/3323* (2020.01)

(58) Field of Classification Search
CPC .. G06F 11/263; G06F 17/5054; G06F 17/504; G06F 17/5022; G06F 17/505
USPC ................................. 716/101, 104, 106, 136
See application file for complete search history.

(56) References Cited

U.S. PATENT DOCUMENTS

| | | | | |
|---|---|---|---|---|
| 4,635,261 | A * | 1/1987 | Anderson et al. | ........................... G01R 31/2884 714/732 |
| 5,790,965 | A * | 8/1998 | Abe | ...................... G01M 15/05 307/10.1 |
| 6,026,230 | A * | 2/2000 | Lin et al. | ................. G06F 30/33 703/13 |
| 6,122,756 | A * | 9/2000 | Baxter et al. | ........... G06F 11/22 714/3 |
| 6,134,516 | A * | 10/2000 | Wang et al. | .......... G06F 30/331 703/27 |
| 6,321,366 | B1 * | 11/2001 | Tseng et al. | ............ G06F 30/33 326/94 |
| 6,389,379 | B1 * | 5/2002 | Lin et al. | ............... G06F 30/331 703/14 |

(Continued)

OTHER PUBLICATIONS

Saxena, "Autonomous Car; A New Driver for Resilient Computing and Design-for-Test" PowerPoint presentation, Jun. 15, 2016, 38 pages, Nirmal Saxena.

(Continued)

*Primary Examiner* — Sun J Lin
(74) *Attorney, Agent, or Firm* — Spectrum IP Law Group LLC (57) ABSTRACT

Methods and apparatus relating to diagnostic testing of FPGAs for safety critical systems are described. In an embodiment, logic circuitry (e.g., a processor) performs one or more diagnostic operations on a portion of a Field Programmable Gate Array (FPGA) based on one or more test vectors. Memory stores the one or more test vectors. The logic circuitry performs the one or more diagnostic operations on the portion of the FPGA during runtime. Other embodiments are also disclosed and claimed.

20 Claims, 10 Drawing Sheets

(56) References Cited

U.S. PATENT DOCUMENTS

| | | | |
|---|---|---|---|
| 6,651,225 B1* | 11/2003 | Lin et al. | G06F 30/331 |
| | | | 716/113 |
| 6,694,464 B1* | 2/2004 | Quayle et al. | G01R 31/31717 |
| | | | 714/725 |
| 7,389,460 B1* | 6/2008 | Demara | G01R 31/318519 |
| | | | 714/733 |
| 7,512,728 B2* | 3/2009 | Tseng | G06F 13/4291 |
| | | | 710/100 |
| 9,497,572 B2* | 11/2016 | Britt et al. | G06F 8/36 |
| 10,491,381 B2* | 11/2019 | Shah et al. | H04L 9/3247 |
| 2019/0140648 A1* | 5/2019 | Clark et al. | H01L 24/14 |

OTHER PUBLICATIONS

Boundary-Scan for PCT Interconnect Testing and In-System Programming of CPLDs and Flash Memories, CORELIS An EWA Company, 7 pps.

Jong, "Boundary Scan Test, Test Methodology, and Fault Modeling," Feb. 5, 1990, Journal of Electronic Testing: Theory and Applications, 2, pp. 77-88.

Wrona, et al. "Early Failure Detection in Fatigue Tests of BGA Packages," 4 pp.

Chen, et al. "The Experimental Study for the Solder Joint Reliability of High I/O FCBGAs With Thermal Loaded Bend Test," IEEE Transactions on Components and Packaging Technologies, vol. 29, No. 1, Mar. 2006, 6 pp.

Gopel Electronic, "JTAG/Boundary Scan-Design for Testability Foresighted Board Level Design for Optimal Testability," Apr. 20, 2010, 32 pp.

Kumar, et al. "A Novel Method for Diagnosis of Board Level Interconnect Faults Using Boundary Scan," Int'l Conf. on Computer & Communication Technology (ICCCT'10), pp. 270-275.

Jutman, "At-Speed On-Chip Diagnosis of Board-Level Interconnect Faults," Tallinn University of Technology, 6 pp.

Tullosss, et al. "Bist & Boundary-Scan for Board Level Test: Test Program Pseudocode," AT&T Bell Laboratories Engineering Research Center, IEEE, 1989, pp. 106-111.

\* cited by examiner

DIAGNOSTIC TESTING OF FPGAS FOR SAFETY CRITICAL SYSTEMS

FIELD

The present disclosure generally relates to the field of electronics. More particularly, an embodiment relates to diagnostic testing of FPGAs (Field Programmable Gate Arrays) for safety critical systems.

BACKGROUND

Functional safety is important for the real time complex systems such as autonomous driving and/or IOT (Internet Of Things) applications in the automotive and industrial segments. All these applications may impose tight constraints on the system to perform safely and reliably under complex and noisy system environments across a product's life cycle.

Additionally, some of these systems may use FPGAs to perform functional safety critical automotive and industrial tasks. Conventional solutions may rely on manual examination or testing of FPGA implementations or design of application specific diagnostics. However, such solutions may be time consuming to implement, require frequent changes, and are hard to measure diagnostic coverage as they are not generally quantifiable.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, FPGAs require diagnostic capabilities for use in Functional Safety Applications (FuSa). However, conventional solutions may rely on manual examination or testing of FPGA implementations or design of application specific diagnostics. However, such solutions may be time consuming to implement (e.g., to build a custom solution for each application), require changes to diagnostic circuits with each application change, and are hard to measure diagnostic coverage as they are not generally quantifiable.

To this end, some embodiments relate to diagnostic testing of FPGAs for safety critical systems (such as real time complex systems such as autonomous driving and/or IOT (Internet Of Things) applications in the automotive and industrial segment). One embodiment provides the ability to perform diagnostic checks of an FPGA device without the need to expose proprietary FPGA test methods. This approach can use existing test frameworks and tools to provide a relatively simple solution for diagnostic coverage of an FPGA design.

Moreover, using existing Design For Test (DFT) methodologies combined with FPGA specific enhancements permit the creation of quantifiable safety diagnostic solutions. For example, customers can apply the techniques described herein to obtain sufficient diagnostic coverage to satisfy Automotive Safety Integrity Level (ASIL) Functional Safety (FuSa) requirements; particularly, targeting key-on/key-off diagnostic requirements (where the goal is to maintain FuSa through run-time diagnostic operations performed during the period between key-on and key-off of a vehicle (i.e., during drive time)).

Utilizing such embodiments may allow for one or more of: configurability (e.g., overlaying design with diagnostics), novel methods of testing FPGAs, lack of need for redundancy, and testing FPGAs before each run or before each use (e.g., since some embodiments do not test everything, testing is feasible even during runtime, e.g., to meet key-on/key-off diagnostic requirements). Hence, some embodiments allow for: (a) FPGAs to be competitive in automotive and other safety critical applications; (b) reduction of time to develop diagnostic solutions for FPGA-based designs; and/or (c) quantifiable coverage metrics that can be used to achieve select ASIL diagnostic coverage (including, for example, test coverages, stuck-at faults, etc.).

In one embodiment, only features used by a design are tested, not the entire FPGA. In practice, a typical design may use less than 50% of all the configurable elements in an FPGA (logic elements, routing, clocks, etc.). Hence, one or more embodiments allow for testing even during runtime, e.g., to meet ASIL FuSa key-on/key-off diagnostic requirements.

As discussed herein, a "vehicle" generally refers to any transportation device (whether or not it is capable of being operated autonomously, e.g., with little or no human/driver intervention), such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle. Also, while certain embodiments may mention a specific number of components/items, embodiments are not limited to these specific numbers, different or more/less components may be utilized depending on the implementation.

In one embodiment, logic (such the safety processor 208 of FIG. 2) discussed herein to perform various operations including FPGA testing (e.g., during runtime) may be included in an IoT device. Moreover, an "IoT" device generally refers to a device which includes electronic processing circuitry (such as one or more processor/cores, PLA (Programmable Logic Array), system on a chip (SoC), ASIC (Application Specific Integrated Circuit), FPGA, etc.), memory (e.g., to store software or firmware), one or more sensors (or is otherwise coupled to one or more sensors such as a camera, motion detector, etc.), and network connectivity to allow the IoT device to collect and/or exchange data. IoT devices can be cheaper than traditional computing devices to allow for their proliferation at remote locations. IoT devices can also reduce costs by using existing infrastructure (such as the Internet, a (third generation (3G), fourth generation (4G), or fifth generation (5G) cellular/wireless network, etc.). More generally, an IoT device may include one or more components such as those discussed herein with reference to the figures.

Generally, there are three aspects for diagnostic coverage in a programmable solution for testing FPGAs: (1) core programmable logic; (2) programmable input and output pins; and (3) fixed function circuits. One or more embodiments include diagnostic coverage for core programmable logic (1). More particularly, diagnostic coverage includes: stuck-at faults, clock faults, Logic Element (LE) configuration errors, and/or routing configuration errors. Modern DFT tools allow the customer to target a specific coverage metric. The customer will decide the level of coverage. Programmable Input and Output pins (2) need specialized circuits built into a specialized device. Fixed function circuits (3) have well defined methods for diagnostic coverage. In at least one embodiment, the programmable Input and Output pins (2) and the fixed function circuits (3) are excluded from diagnostic coverage.

Figure 1:
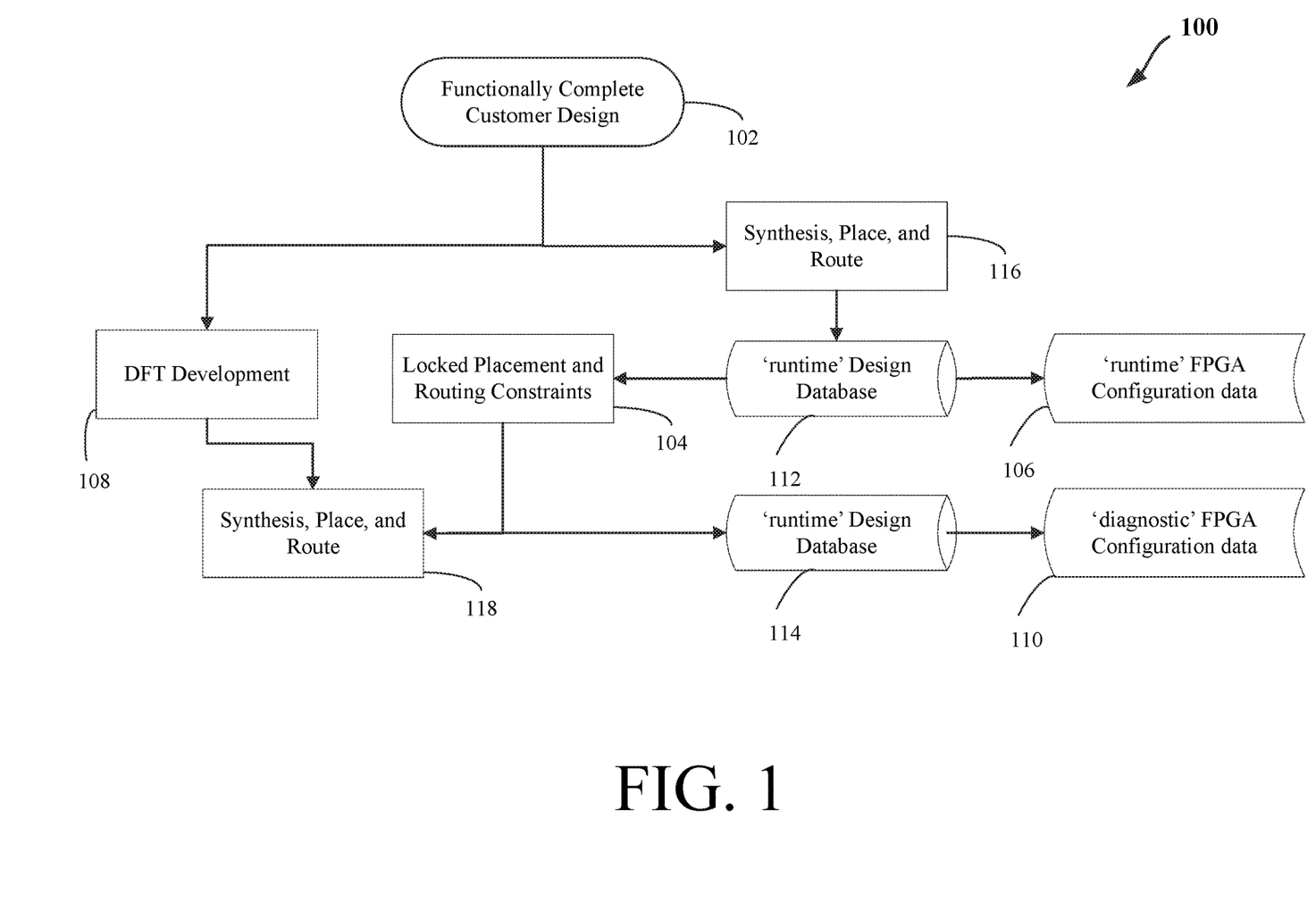
FIG. 1 illustrates a flow diagram of a method to perform FPGA diagnostic development, according to an embodiment.

FIG. 1 illustrates a flow diagram of a method 100 to perform FPGA diagnostic development, according to an embodiment. The flow chart of FIG. 1 shows the development path to produce the two FPGA configurations (the runtime FPGA configuration data and the diagnostic FPGA configuration data).

More particularly, core programmable logic diagnostic testing includes the operations of: development and deployment. In an embodiment (referring to FIG. 1), the development operation includes (e.g., a user): (1) completing a design 102 using FPGA implementation tools (e.g., Quartus® provided by Intel® Corporation); (2) locking 104 design features (such as synthesis, logic placement, signal routing, and clock routing 116/118; this design becomes the 'runtime' design 106 or the design ready for runtime); (3) applying existing 'Design for Test' (DFT) techniques 108 (such as scan insertion) to create a new 'diagnostic' design 110 with the desired coverage, the DFT operation 108 may also provide test vectors; in addition, FPGA features may be exploited to improve coverage and reduce the need for specialized DFT circuits; (4) deployment of both the diagnostic design and test vectors in field operation. As shown in FIG. 1, one or more runtime design databases 112/114 may be accessed for synthesis, placement, and routing 116/118. As discussed herein, a "user" of an FPGA or an "FPGA user" generally refer to the person who designs and/or configures an FPGA (essentially, this is the engineer giving the FPGA functionality).

Furthermore, in some embodiments, the deployment operation for the core programmable logic includes: (1) receiving a request to perform an FPGA diagnostic test from the safety system/processor (e.g., a safety system provided in an autonomous driving vehicle); (2) loading (e.g., by a user) the FPGA 'diagnostic' design (such as discussed with reference to FIGS. 1-5); (3) applying the test vectors by a safety processor to the 'diagnostic' design DFT circuitry; (4) reading (e.g., by a user) the DFT results to determine a pass/fail condition; (5) if DFT results pass, then the user reloading the FPGA with the 'runtime' design, and normal operation proceeds; (6) if DFT results fail, logging the event to the system (where (a) event can be I/O or signaling to safety processor; and (b) system safety management performs appropriate actions).

As discussed herein, a "safety processor" generally refers to hardware logic that executes one or more instructions to perform safety related operations. The safety processor is the safety supervising circuit in the system. The safety processor is the final arbitrator of safety related functions in the system. In an embodiment, the safety processor may be a separate processor than other execution logic in the system, e.g., to ensure that operations performed by the safety processor are segregated from other operations performed in the system to reduce any potential for safety/security risk.

Figure 2:
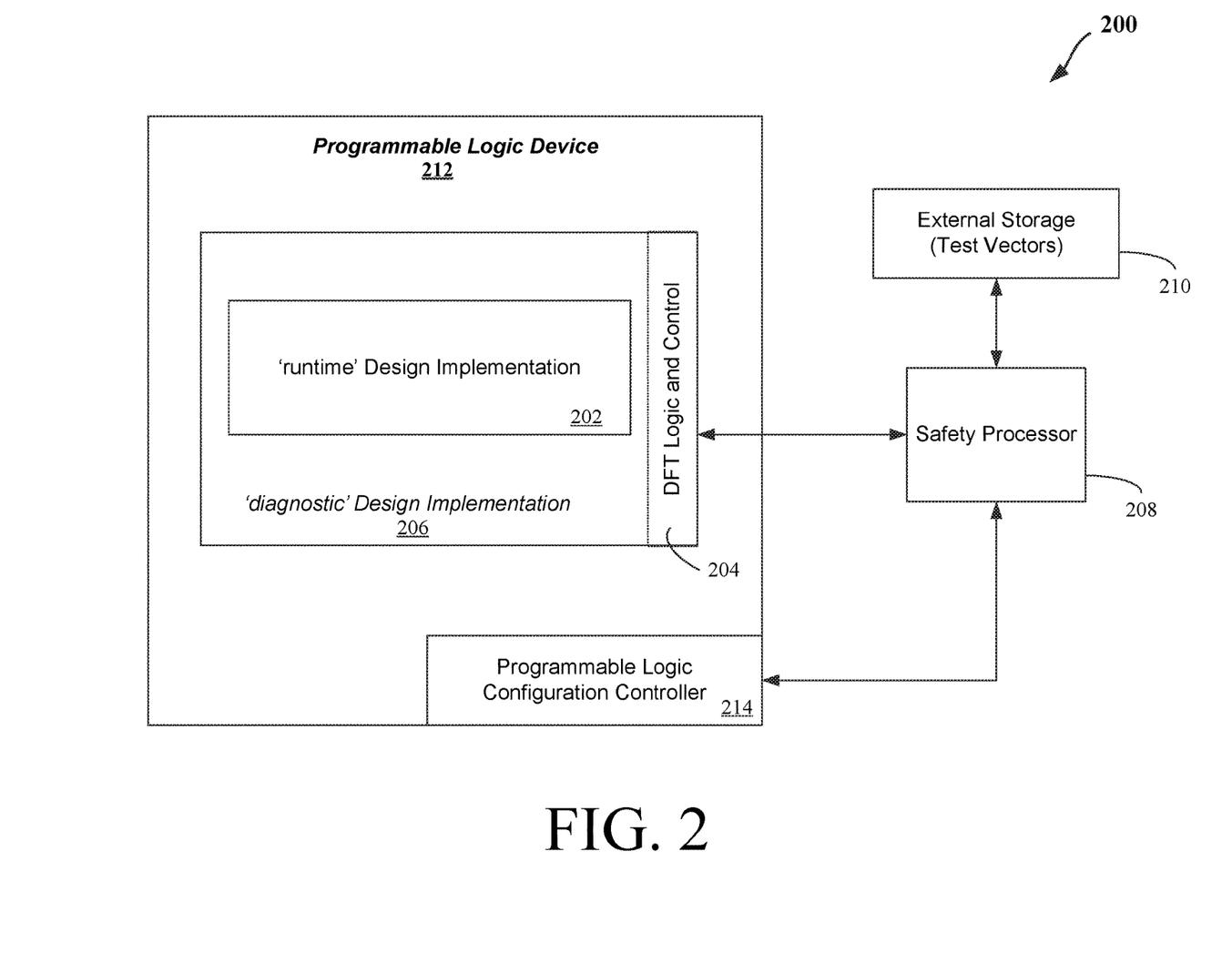
FIG. 2 illustrates an overview of a diagnostic system, according to an embodiment.

FIG. 2 illustrates an overview of a diagnostic system 200, according to an embodiment. System 200 includes the 'runtime' design 202 wrapped by the DFT logic 204 (creating the 'diagnostic' design 206). A separate safety processor 208 is used to run the diagnostic tests (e.g., per test vectors stored in memory 210) and interpret the results. The safety processor 208 can be on-die, in-package, or external to the FPGA. Programmable logic device 212 includes the diagnostic design implementation and a programmable logic configuration controller/logic 214. As shown, both the DFT logic and control 204 and the programmable logic configuration controller/logic 214 communicates with the safety processor 208.

Figure 3:
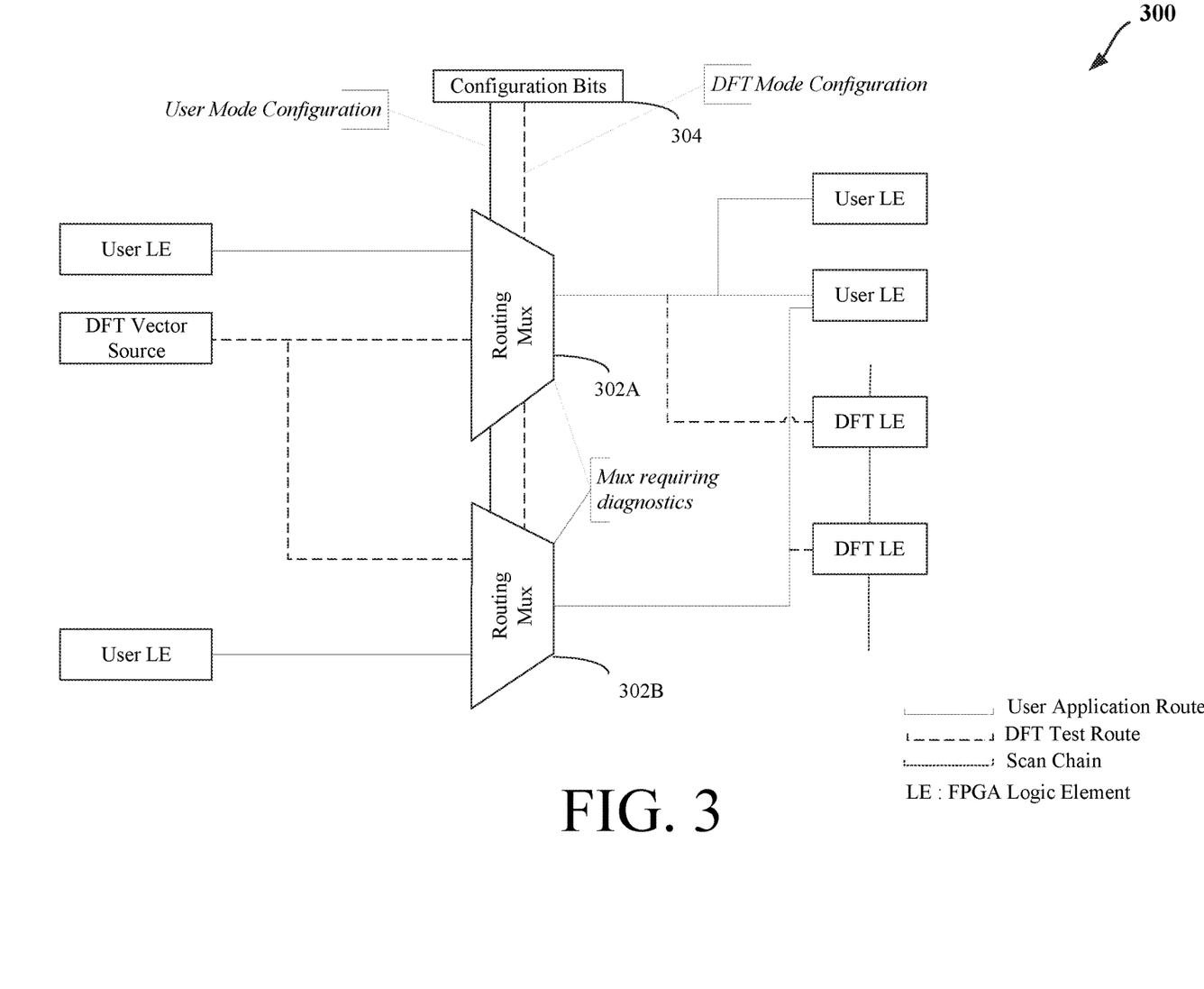
FIGS. 3, 4, and 5 show FPGA-specific design for test (DFT) circuits that may be used by DFT tools to achieve high diagnostic coverage, according to some embodiments.
Figure 4:
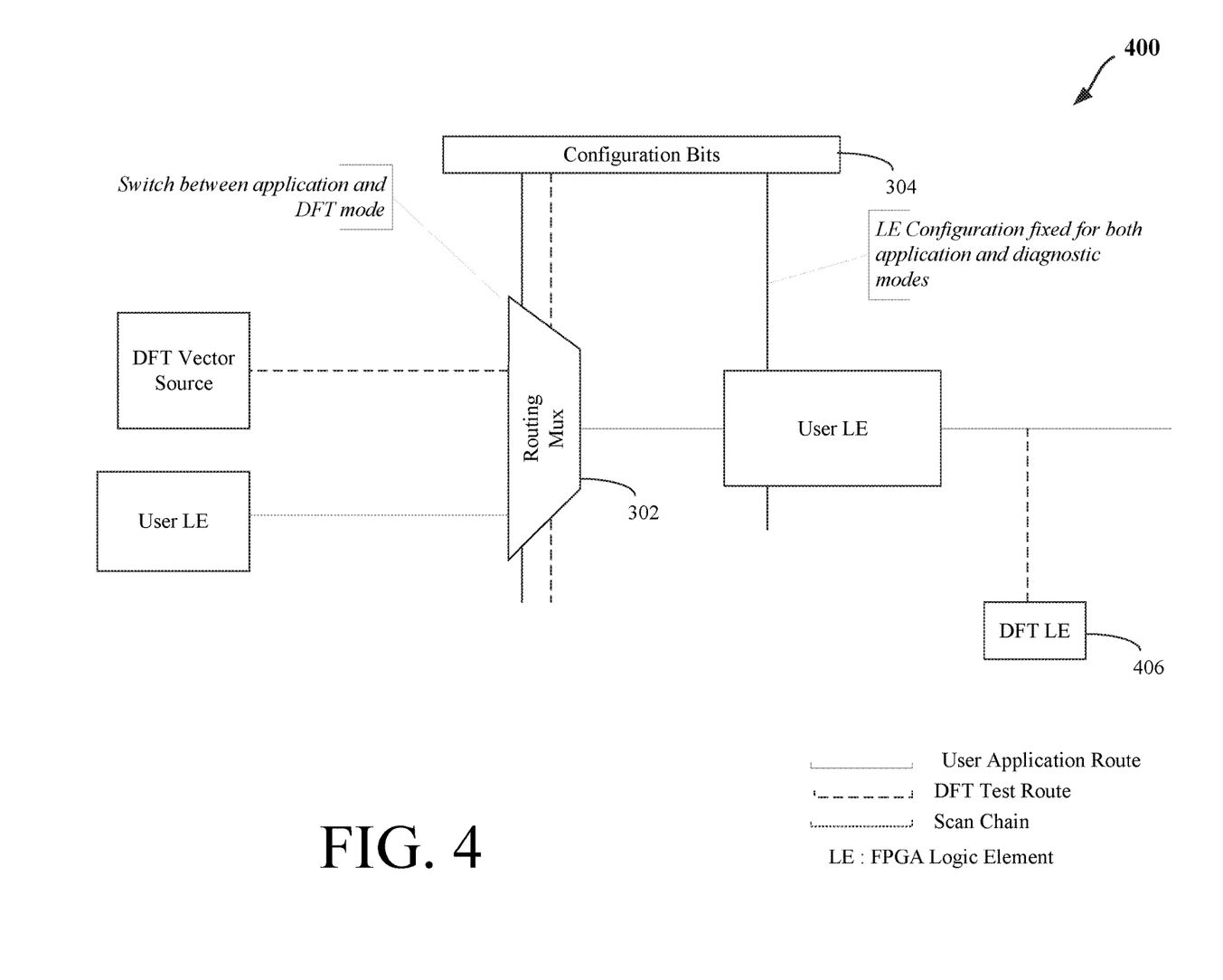
Figure 5:
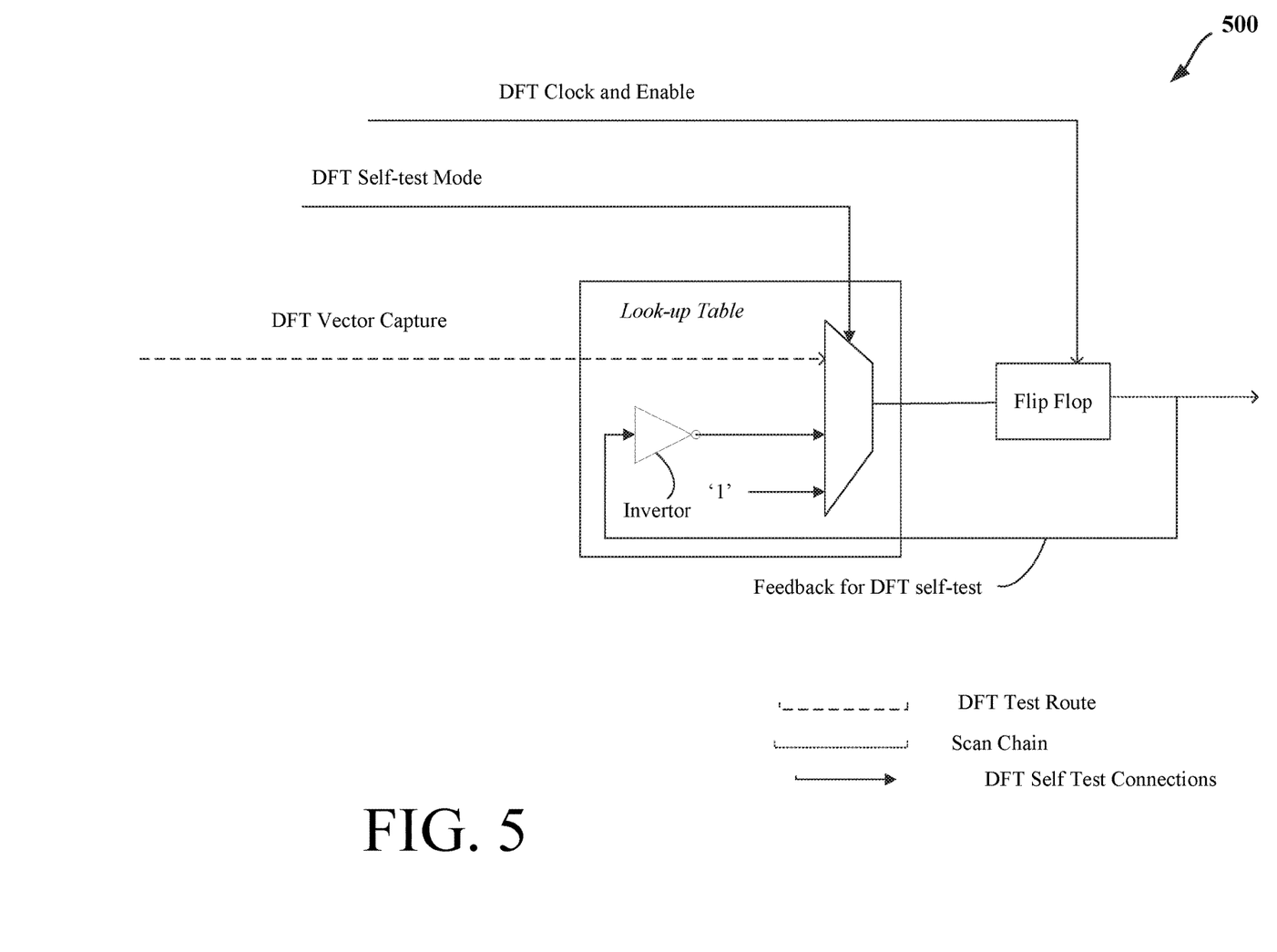

FIGS. 3-5 show FPGA-specific DFT circuits that may be used by DFT tools to achieve high diagnostic coverage, according to some embodiments. FIG. 3 illustrates a circuit 300 that may be utilized for routing. In FIGS. 3-5, the user Logic Elements (LEs) are the FPGA logic elements that the user programmed to perform the desired applications/operations. The DFT LE is inserted by a Computer Aided Design (CAD) tool to provide circuit monitoring and diagnostics. The user does not program the DFT LE in some embodiments.

FPGAs can employ many multiplexers 302A/302B in their routing network (e.g., to route signals between user LEs, DFT LEs, and DFT vectors). These multiplexers are controlled by configuration bits 304 (sometimes called Configuration RAM or CRAM). In an embodiment, 30 bits/wires may be used for routing. As the routing multiplexers are a large portion of the circuitry, high diagnostic coverage is supported.

Referring to FIG. 3, the diagnostic circuit for FPGA routing multiplexers is shown. FPGA routing multiplexers 302A/302B are checked at key-on/key-off (hence, the DFT circuitry has to understand FPGA routing topology). The FPGA routing is used to connect between computation blocks. The most common FPGA computation block is the Logic Element (LE). The solid lines represent the routing topology in user mode (the user mode routing is reserved before creating 'diagnostic' design). The long dash lines represent the DFT routes (these are used to inject and record the mux functionality). The 'DFT LE' is used to record the test vectors and transport them to the safety processor 208 (see, e.g., FIG. 5 for more details on the DFT LE).

FIG. 4 illustrates circuit 400 for logic element diagnostic coverage, according to an embodiment. More particularly, circuit 400 includes components for a user mode LE diagnostic.

Moreover, in addition to routing, the user mode of the Logic Elements (LE) also provides diagnostic coverage. The LE has generally has thousands of potential operating modes. It is infeasible to test all the modes. Efficiently, only the user's specific modes need to be tested. During runtime the FPGA LE can only be in a single mode; therefore, only that mode undergoes diagnostic testing.

In an embodiment, application LEs are locked by the FPGA Electronic Design Automation (EDA) tool/software (LE location and LE configuration). Routing in/out of the LE is changed during the diagnostic test. As discussed herein, the terms "application" LE is interchangeable with "user" LE. Commercial DFT tools may generate test vectors to cover each the Application LE functionality. DFT LE 406 can be used to capture the Application LE outputs.

FIG. 5 shows a circuit 500 of a DFT LE, according to an embodiment. This diagnostic circuitry relies on DFT vectors being captured and transported to the safety processor 208. The DFT LE is a special configuration of a normal FPGA LE, which supports storage of vectors by using LE storage capability. DFT LE blocks are connected to create a network to transport the captured DFT vectors to the safety processor 208 (also referred to as the scan chain). The DFT LE is also able to perform a self-test to insure the integrity of the DFT system. Further, in FIG. 5, the DFT LE has a diagnostic mode that allows the scan chain to invoke a toggling binary 101010 . . . pattern. This pattern can be checked by the safety processor.

Figure 6:
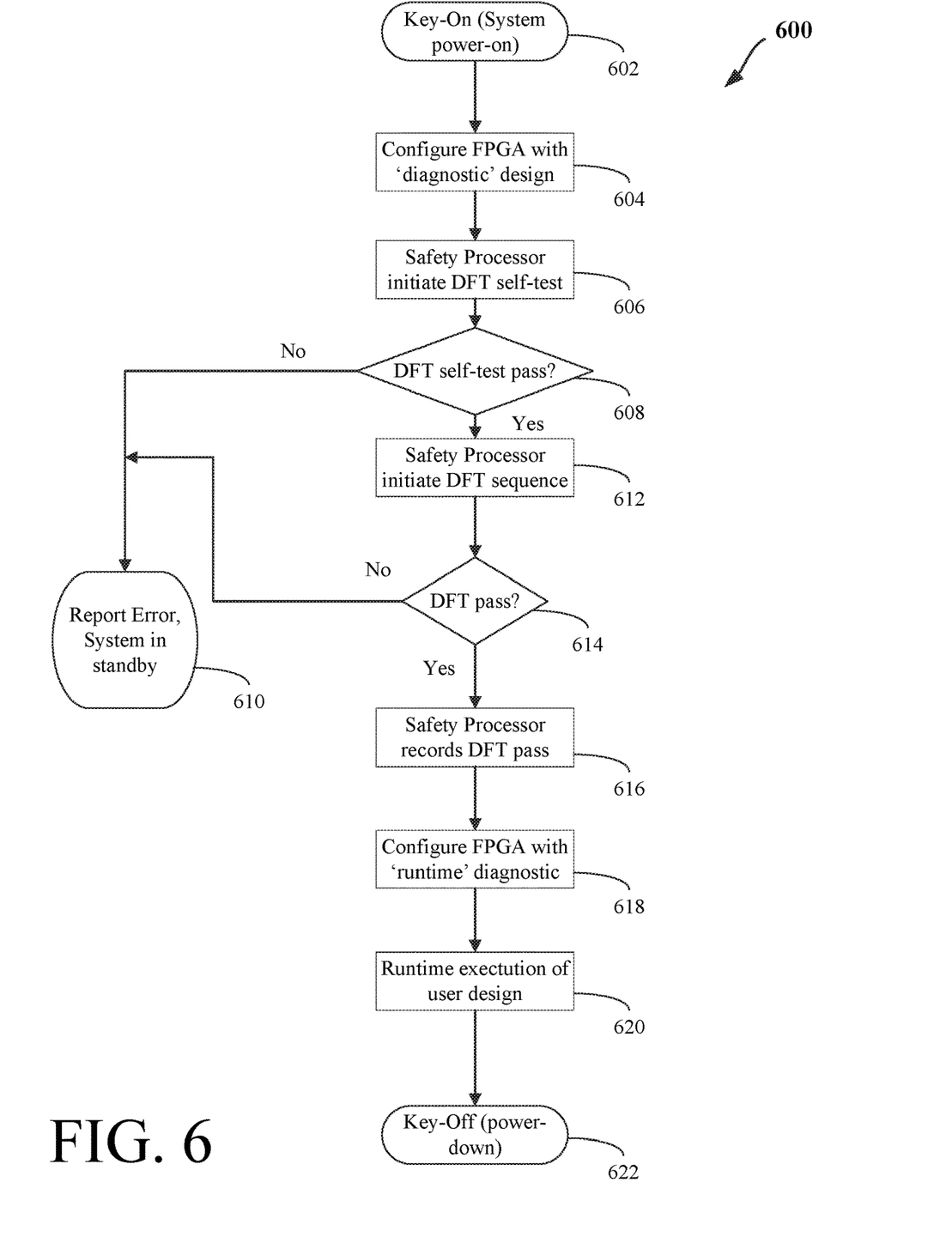
FIG. 6 illustrates a flow diagram of a method to perform runtime deployment or diagnostic, according to an embodiment.

FIG. 6 illustrates a flow diagram of a method 600 to perform runtime deployment/diagnostic, according to an embodiment. Method 600 shows the diagnostic operations when deployed in the field.

Referring to FIG. 6, after system power on at operation 602, operation 604 configures the FPGA with a diagnostic design (such as discussed with reference to FIGS. 1-5). At operation 606, the safety processor 208 initiates DFT self-test. If the DFT self-test fails 608, operation 610 reports error, and optionally puts the system in standby mode. If the DFT self-test passes 608, the safety processor 208 initiates a DFT sequence at operation 612. If the DFT fails 614, method 600 continues with operation 610. If the DFT passes 614, the safety processor records the DFT pass at operation 616. Operation 618 configures the FPGA with runtime diagnostic (such as discussed with reference to FIGS. 1-5). Operation 620 performs runtime execution of the user design. Method 600 terminates at operation 622 once the system is powered down.

Figure 7:
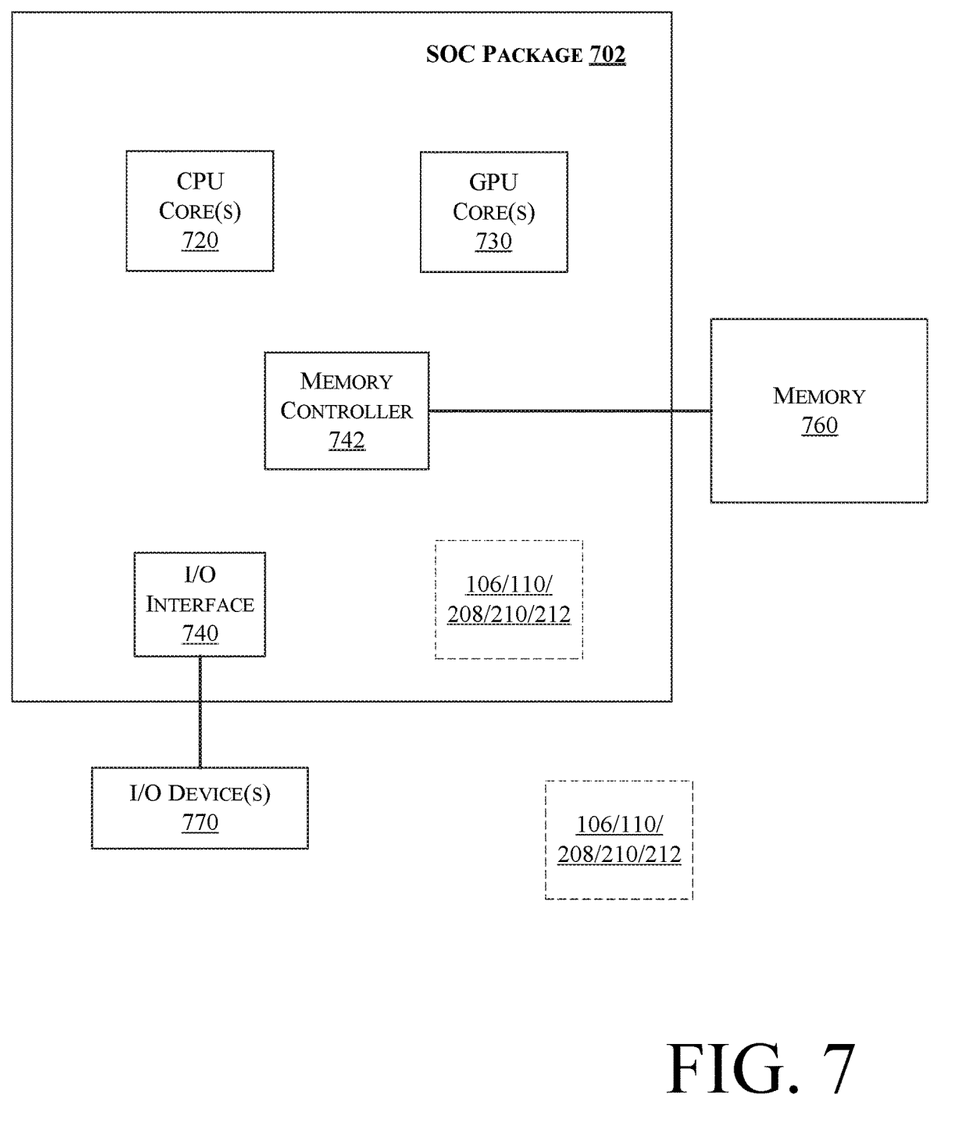
FIGS. 7 and 8 illustrate block diagrams of embodiments of computing systems, which may be utilized in various embodiments discussed herein.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
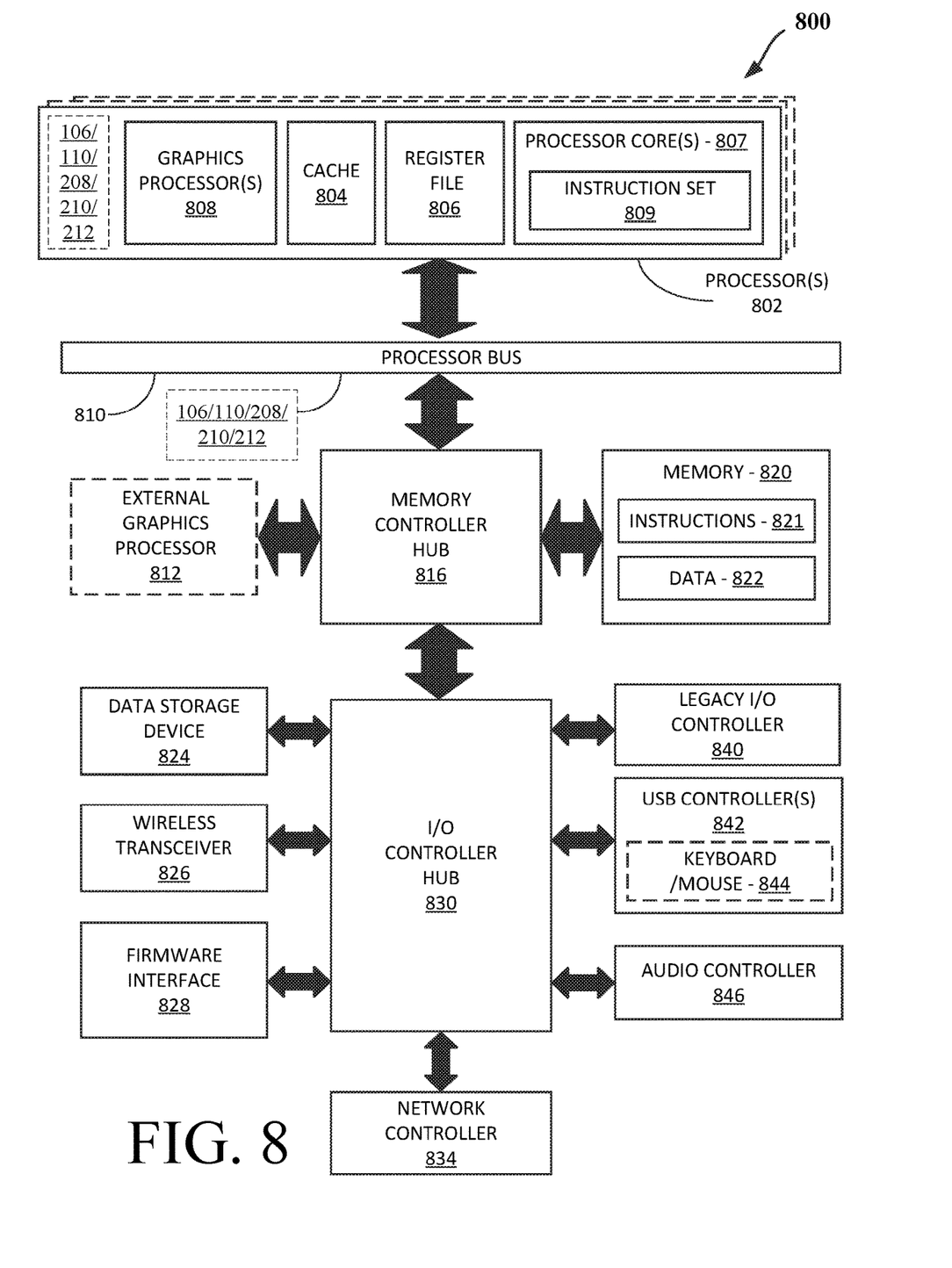

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a vehicle, mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
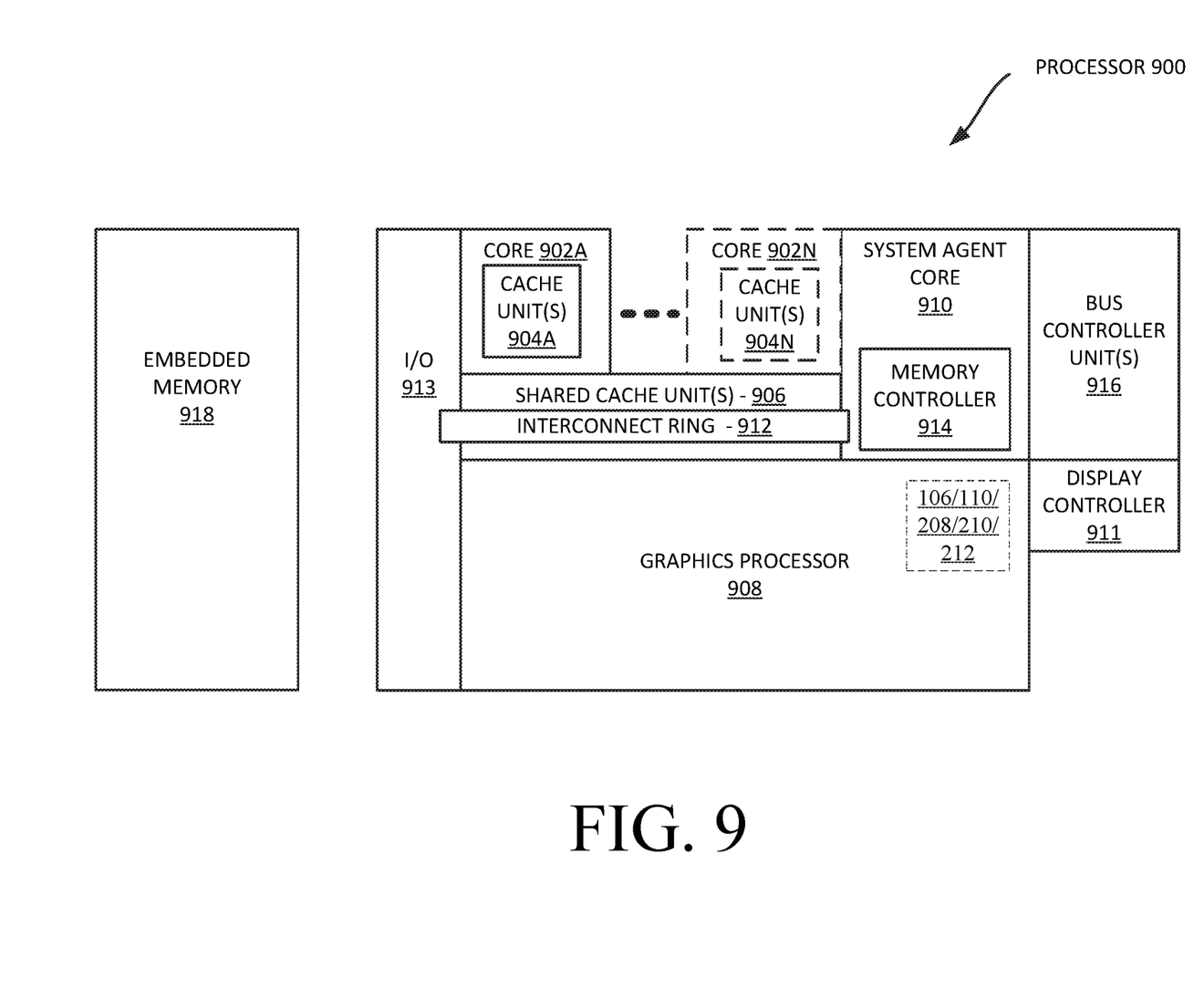
FIGS. 9 and 10 illustrate various components of processers in accordance with some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring-based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of microarchitecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
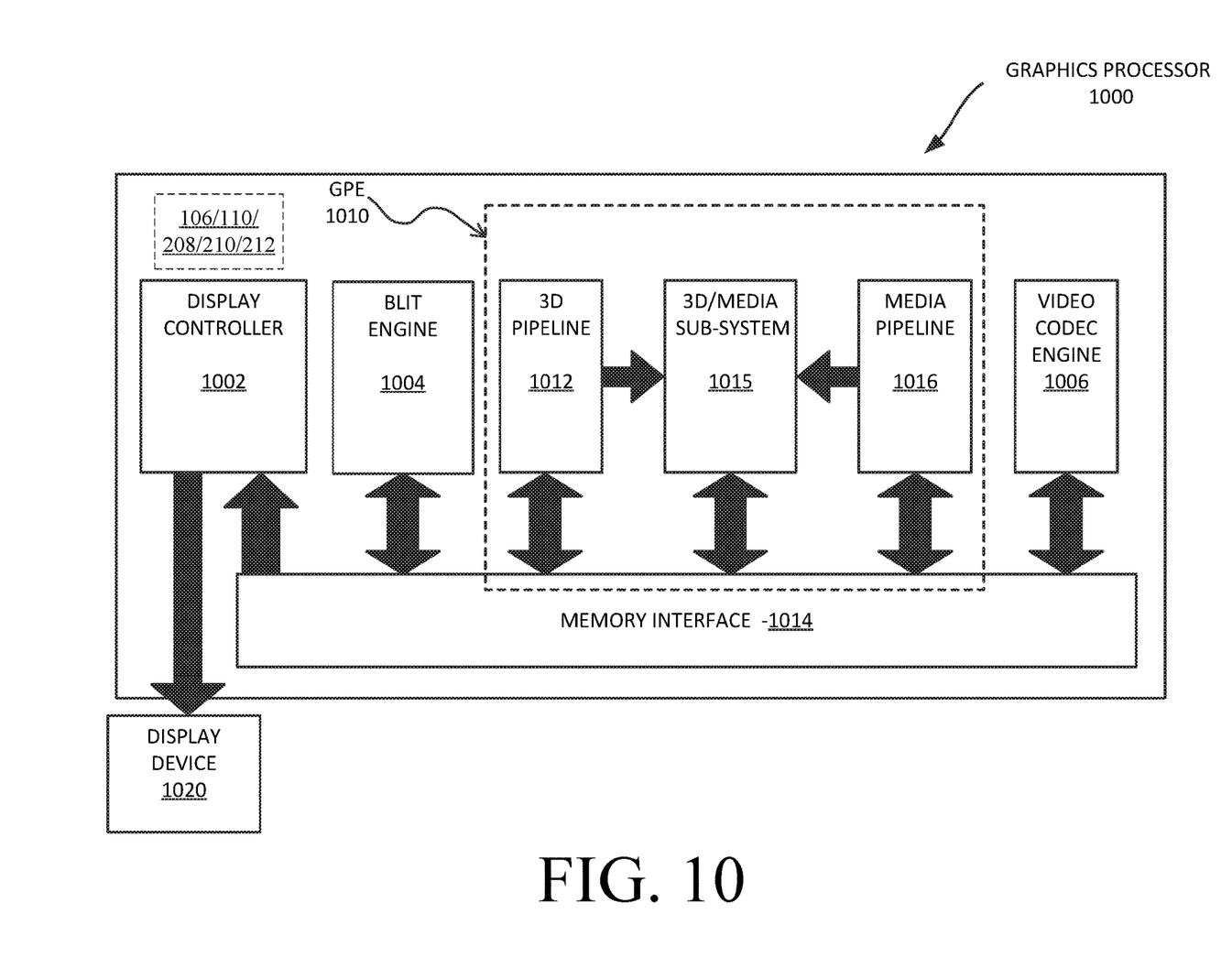

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 10D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media sub-system 1015.

In some embodiments, 3D/Media subsystem 1015 includes logic for executing threads spawned by 3D pipeline 1012 and media pipeline 1016. In one embodiment, the pipelines send thread execution requests to 3D/Media sub-system 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: logic circuitry to perform one or more diagnostic operations on a portion of a Field Programmable Gate Array (FPGA) based on one or more test vectors; and memory to store the one or more test vectors, wherein the logic circuitry is to perform the one or more diagnostic operations on the portion of the FPGA during runtime. Example 2 includes the apparatus of example 1, wherein the portion of the FPGA comprises core programmable logic. Example 3 includes the apparatus of example 1, wherein the portion of the FPGA excludes programmable input and output pins and fixed function circuits. Example 4 includes the apparatus of example 1, wherein the one or more diagnostic operations comprise one or more of: a stuck-at fault error, a clock fault error, a Logic Element (LE) configuration error, and a routing configuration error. Example 5 includes the apparatus of example 1, wherein the portion of the FPGA comprises core programmable logic, wherein diagnostic testing of the core programmable logic includes a development operation and a deployment operation. Example 6 includes the apparatus of example 5, wherein the development operation comprises: completion of a design using an FPGA implementation tool, locking of design features, application of one or more Design For Test (DFT) operations to generate a diagnostic design, and deployment of both the one or more test vectors and the diagnostic design for field operation. Example 7 includes the apparatus of example 6, wherein the completion of the design is to be performed by a Quartus® tool. Example 8 includes the apparatus of example 6, wherein locking of the design features comprises: locking: logic placement, signal routing, and clock routing. Example 9 includes the apparatus of example 8, wherein locking of the design features is to indicate that the design is a runtime design. Example 10 includes the apparatus of example 6, wherein the one or more DFT operations are to provide the one or more test vectors. Example 11 includes the apparatus of example 5, wherein the deployment operation comprises: receipt of a request to perform a diagnostic test on the portion of the FPGA, loading of an FPGA diagnostic design, application of the one or more test vectors, reading results of the application, and reloading the FPGA with a runtime design in response to an indication by the results that the FPGA has passed diagnostics test, and logging of an event in response to an indication by the results that the FPGA has failed the diagnostics test. Example 12 includes the apparatus of example 1, wherein a System On Chip (SOC) device or a signal integrated circuit device comprises one or more of: the logic circuitry, the memory, and a processor having one or more processor cores. Example 13 includes the apparatus of example 1, wherein an Internet of Things (IoT) device comprise one or more of: the logic circuitry, the memory, and a processor having one or more processor cores. Example 14 includes the apparatus of example 1, wherein a vehicle comprises the logic circuitry and the memory. Example 15 includes the apparatus of example 14, wherein the vehicle comprises one or more of: an automobile, a truck, a motorcycle, an airplane, a helicopter, a vessel or ship, a train, or a drone.

Example 16 includes one or more computer-readable medium comprising one or more instructions that when executed on at least one processor configure the at least one processor to perform one or more operations to: perform one or more diagnostic operations on a portion of a Field Programmable Gate Array (FPGA) based on one or more test vectors; and cause storage of the one or more test vectors in memory, wherein the processor is to perform the one or more diagnostic operations on the portion of the FPGA during runtime. Example 17 includes the one or more computer-readable medium of example 16, wherein the portion of the FPGA comprises core programmable logic. Example 18 includes the one or more computer-readable medium of example 16, wherein the one or more diagnostic operations comprise one or more of: a stuck-at fault error, a clock fault error, a Logic Element (LE) configuration error, and a routing configuration error. Example 19 includes the one or more computer-readable medium of example 16, wherein the portion of the FPGA comprises core programmable logic, wherein diagnostic testing of the core programmable logic includes a development operation and a deployment operation. Example 20 includes the one or more computer-readable medium of example 19, wherein the development operation comprises: completion of a design using an FPGA implementation tool, locking of design features, application of one or more Design For Test (DFT) operations to generate a diagnostic design, and deployment of both the one or more test vectors and the diagnostic design for field operation. Example 21 includes the one or more computer-readable medium of example 19, wherein the deployment operation comprises: receipt of a request to perform a diagnostic test on the portion of the FPGA, loading of an FPGA diagnostic design, application of the one or more test vectors, reading results of the application, and reloading the FPGA with a runtime design in response to an indication by the results that the FPGA has passed diagnostics test, and logging of an event in response to an indication by the results that the FPGA has failed the diagnostics test.

Example 22 includes a method comprising: performing one or more diagnostic operations on a portion of a Field Programmable Gate Array (FPGA) based on one or more test vectors; and causing storage of the one or more test vectors in memory, wherein a processor performs the one or more diagnostic operations on the portion of the FPGA during runtime. Example 23 includes the method of example 22, wherein the portion of the FPGA comprises core programmable logic. Example 24 includes the method of example 22, wherein the one or more diagnostic operations comprise one or more of: a stuck-at fault error, a clock fault error, a Logic Element (LE) configuration error, and a routing configuration error. Example 25 includes the method of example 22, wherein the portion of the FPGA comprises core programmable logic, wherein diagnostic testing of the core programmable logic includes a development operation and a deployment operation. Example 26 includes the method of example 25, wherein the development operation comprises: completion of a design using an FPGA implementation tool, locking of design features, application of one or more Design For Test (DFT) operations to generate a diagnostic design, and deployment of both the one or more test vectors and the diagnostic design for field operation. Example 27 includes the method of example 25, wherein the deployment operation comprises: receipt of a request to perform a diagnostic test on the portion of the FPGA, loading of an FPGA diagnostic design, application of the one or more test vectors, reading results of the application, and reloading the FPGA with a runtime design in response to an indication by the results that the FPGA has passed diagnostics test, and logging of an event in response to an indication by the results that the FPGA has failed the diagnostics test. Example 28 includes an apparatus comprising means to perform a method as set forth in any preceding example.

Example 29 includes machine-readable storage including machine-readable instructions, when executed, to implement a method or realize an apparatus as set forth in any preceding example.

In various embodiments, the operations discussed herein, e.g., with reference to FIGS. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
logic circuitry to perform one or more diagnostic operations on a portion of a Field Programmable Gate Array (FPGA) based on one or more test vectors; and
memory to store the one or more test vectors,
wherein the logic circuitry is to perform the one or more diagnostic operations on the portion of the FPGA during runtime, wherein a vehicle comprises the logic circuitry and the memory.

2. The apparatus of claim 1, wherein the portion of the FPGA comprises core programmable logic.

3. The apparatus of claim 1, wherein the portion of the FPGA excludes programmable input and output pins and fixed function circuits.

4. The apparatus of claim 1, wherein the one or more diagnostic operations are to check for one or more of: a stuck-at fault error, a clock fault error, a Logic Element (LE) configuration error, and a routing configuration error.

5. The apparatus of claim 1, wherein the portion of the FPGA comprises core programmable logic, wherein diagnostic testing of the core programmable logic includes a development operation and a deployment operation.

6. The apparatus of claim 5, wherein the development operation comprises:
   completion of a design using an FPGA implementation tool, locking of design features, application of one or more Design For Test (DFT) operations to generate a diagnostic design, and deployment of both the one or more test vectors and the diagnostic design.

7. The apparatus of claim 6, wherein the locking of the design features comprises locking: logic placement, signal routing, and clock routing.

8. The apparatus of claim 6, wherein the locking of the design features is to indicate that the design is a runtime design.

9. The apparatus of claim 6, wherein the one or more DFT operations are to provide the one or more test vectors.

10. The apparatus of claim 5, wherein the deployment operation comprises: receipt of a request to perform a diagnostic test on the portion of the FPGA, loading of an FPGA diagnostic design, application of the one or more test vectors, reading results of the application, and reloading the FPGA with a runtime design in response to an indication by the results that the FPGA has passed diagnostics test, and logging of an event in response to an indication by the results that the FPGA has failed the diagnostics test.

11. The apparatus of claim 1, wherein a System On Chip (SOC) device or a signal integrated circuit device comprises one or more of: the logic circuitry, the memory, and a processor having one or more processor cores.

12. The apparatus of claim 1, wherein an Internet of Things (IoT) device comprise one or more of: the logic circuitry, the memory, and a processor having one or more processor cores.

13. The apparatus of claim 1, wherein the vehicle comprises one or more of: an automobile, a truck, a motorcycle, an airplane, a helicopter, a vessel or ship, a train, or a drone.

14. One or more non-transitory computer-readable medium comprising one or more instructions that, when executed on at least one processor, configure the at least one processor to perform one or more operations to:
   perform one or more diagnostic operations on a portion of a Field Programmable Gate Array (FPGA) based on one or more test vectors; and
   cause storage of the one or more test vectors in memory, wherein the at least one processor is to perform the one or more diagnostic operations on the portion of the FPGA during runtime, wherein a vehicle comprises the logic circuitry and the memory.

15. The one or more non-transitory computer-readable medium of claim 14, wherein the portion of the FPGA comprises core programmable logic.

16. The one or more non-transitory computer-readable medium of claim 14, wherein the one or more diagnostic operations comprise one or more of: a stuck-at fault error, a clock fault error, a Logic Element (LE) configuration error, and a routing configuration error.

17. The one or more non-transitory computer-readable medium of claim 14, wherein the portion of the FPGA comprises core programmable logic, wherein diagnostic testing of the core programmable logic includes a development operation and a deployment operation.

18. The one or more non-transitory computer-readable medium of claim 17, wherein the development operation comprises: completion of a design using an FPGA implementation tool, locking of design features, application of one or more Design For Test (DFT) operations to generate a diagnostic design, and deployment of both the one or more test vectors and the diagnostic design for field operation.

19. The one or more non-transitory computer-readable medium of claim 17, wherein the deployment operation comprises: receipt of a request to perform a diagnostic test on the portion of the FPGA, loading of an FPGA diagnostic design, application of the one or more test vectors, reading results of the application, and reloading the FPGA with a runtime design in response to an indication by the results that the FPGA has passed diagnostics test, and logging of an event in response to an indication by the results that the FPGA has failed the diagnostics test.

20. The one or more non-transitory computer-readable medium of claim 14, wherein the vehicle comprises one or more of: an automobile, a truck, a motorcycle, an airplane, a helicopter, a vessel or ship, a train, or a drone.

* * * * *